United States Patent
Gotoda et al.

(10) Patent No.: US 11,554,774 B2
(45) Date of Patent: Jan. 17, 2023

(54) CONTROL APPARATUS, CONTROL METHOD, AND PROGRAM

(71) Applicant: PIONEER CORPORATION, Tokyo (JP)

(72) Inventors: Akira Gotoda, Kawagoe (JP); Makoto Kurahashi, Kawagoe (JP); Hiroshi Nagata, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 214 days.

(21) Appl. No.: 16/627,247

(22) PCT Filed: May 31, 2018

(86) PCT No.: PCT/JP2018/020916
§ 371 (c)(1),
(2) Date: Dec. 27, 2019

(87) PCT Pub. No.: WO2019/003792
PCT Pub. Date: Jan. 3, 2019

(65) Prior Publication Data
US 2020/0130678 A1    Apr. 30, 2020

(30) Foreign Application Priority Data

Jun. 28, 2017    (JP) .............................. JP2017-125808

(51) Int. Cl.
*B60W 30/08*    (2012.01)
*B60W 50/14*    (2020.01)
(Continued)

(52) U.S. Cl.
CPC ............ *B60W 30/08* (2013.01); *B60W 50/14* (2013.01); *G08G 1/096725* (2013.01);
(Continued)

(58) Field of Classification Search
CPC ................. B60W 30/08; B60W 50/14; B60W 2554/20; B60W 2420/42; B60W 2420/52;
(Continued)

(56) References Cited

U.S. PATENT DOCUMENTS 9,269,263 B2    2/2016  Gieseke
9,477,894 B1    10/2016 Reed et al.
(Continued)

FOREIGN PATENT DOCUMENTS

JP    2009-234435 A    10/2009
JP    2009234435 A  *  10/2009
(Continued)

OTHER PUBLICATIONS

International Search Report for related International Application No. PCT/JP2018/020916, dated Sep. 4, 2018 (1 page).
(Continued)

*Primary Examiner* — Peter D Nolan
*Assistant Examiner* — Demetra R Smith-Stewart
(74) *Attorney, Agent, or Firm* — Procopio, Cory, Hargreaves & Savitch LLP

(57) ABSTRACT

The control apparatus (200) is an apparatus that controls the travel of a target vehicle (10). The control apparatus (200) detects a partial object (20) using a sensor. The partial object (20) is a part of an object riding on the target vehicle (10) and is jutting outside the target vehicle (10). Furthermore, the control apparatus (200) outputs information (travel information) relating to travel of the target vehicle (10) based on the detected partial object (20). For example, the travel information is control information for travel control of the target vehicle (10) and notification information indicating information relating to the partial object (20).

17 Claims, 9 Drawing Sheets

(51) Int. Cl.
*G08G 1/16* (2006.01)
*G08G 1/0967* (2006.01)

(52) U.S. Cl.
CPC ....... *G08G 1/096766* (2013.01); *G08G 1/167* (2013.01); *B60W 2420/42* (2013.01); *B60W 2420/52* (2013.01); *B60W 2554/20* (2020.02)

(58) Field of Classification Search
CPC ....... G08G 1/096725; G08G 1/096766; G08G 1/167
See application file for complete search history.

(56) References Cited

U.S. PATENT DOCUMENTS

| | | | |
|---|---|---|---|
| 9,488,482 | B2 | 11/2016 | Chan et al. |
| 9,757,054 | B2* | 9/2017 | Hyde .................... A61B 5/1114 |
| 10,030,991 | B2 | 7/2018 | Chan et al. |
| 10,147,323 | B2 | 12/2018 | Gieseke |
| 2013/0222592 | A1 | 8/2013 | Gieseke |
| 2015/0066349 | A1 | 3/2015 | Chan et al. |
| 2015/0204681 | A1 | 7/2015 | Chan et al. |
| 2016/0171892 | A1 | 6/2016 | Gieseke |
| 2018/0240335 | A1* | 8/2018 | Dong .................... G08G 1/0112 |
| 2018/0328757 | A1 | 11/2018 | Chan et al. |

FOREIGN PATENT DOCUMENTS

| | | |
|---|---|---|
| JP | 2015-125560 A | 7/2015 |
| JP | 2015-191437 A | 11/2015 |
| JP | 2015-230552 A | 12/2015 |

OTHER PUBLICATIONS

Extended European Search Report dated Mar. 12, 2021 in corresponding European patent application No. 18823112.0, 8 pages.

* cited by examiner

CONTROL APPARATUS, CONTROL METHOD, AND PROGRAM

CROSS-REFERENCE TO RELATED APPLICATIONS

This application is a U.S. National Stage entry of PCT Application No: PCT/JP2018/020916 filed May 31, 2018, which claims priority to Japanese Patent Application No. 2017-125808, filed Jun. 28, 2017, the contents of which are incorporated herein by reference.

TECHNICAL FIELD

The present invention relates to a travel control of a vehicle.

BACKGROUND ART

A technology for detecting a fact that a vehicle is in a dangerous situation is developed. For example, Patent Document 1 discloses a technology for notifying of a dangerous driving when a vehicle travels an intersection. In addition, Patent Document 2 discloses a technology for causing a passenger to select a content of autonomous driving and whether or not to continue the autonomous driving by notifying the passenger of a fact that the risk of autonomous driving is high.

RELATED DOCUMENT

Patent Document

[Patent Document 1] Japanese Patent Application Publication No. 2015-125560
[Patent Document 2] Japanese Patent Application Publication No. 2015-230552

SUMMARY OF THE INVENTION

Technical Problem

In each of Patent Document 1 and Patent Document 2, whether the vehicle is in a dangerous situation or not is determined based on the content of vehicle driving. However, the reason why the vehicle falls into the dangerous situation is not limited to the content of driving.

An object of the present invention is to provide a technology for realizing safe traveling of the vehicle.

Solutions to Problem

According to a first aspect of the invention, there is provided a control apparatus that controls travel of a vehicle. The control apparatus includes 1) a detection unit that detects a partial object that is apart of an object riding on the vehicle and is jutting outside the vehicle using a sensor, and 2) an output control unit that outputs control information relating to the travel of the vehicle based on the detected partial object.

According to a thirteenth aspect of the invention, there is provided a control method that is executed by a computer for controlling the travel of the vehicle. The control method includes 1) a detection step of detecting a partial object that is a part of an object riding on the vehicle and is jutting outside the vehicle using a sensor, and 2) an output control step of outputting travel information relating to the travel of the vehicle based on the detected partial object.

According to a fourteenth aspect of the invention, there is provided a program that causes a computer to execute each step of the control method according to the thirteenth aspect.

BRIEF DESCRIPTION OF THE DRAWINGS

The above-described object and other objects, features, and advantages become more apparent from the preferred embodiments described below and the accompanying drawings.

DESCRIPTION OF EMBODIMENTS

Figure 1:
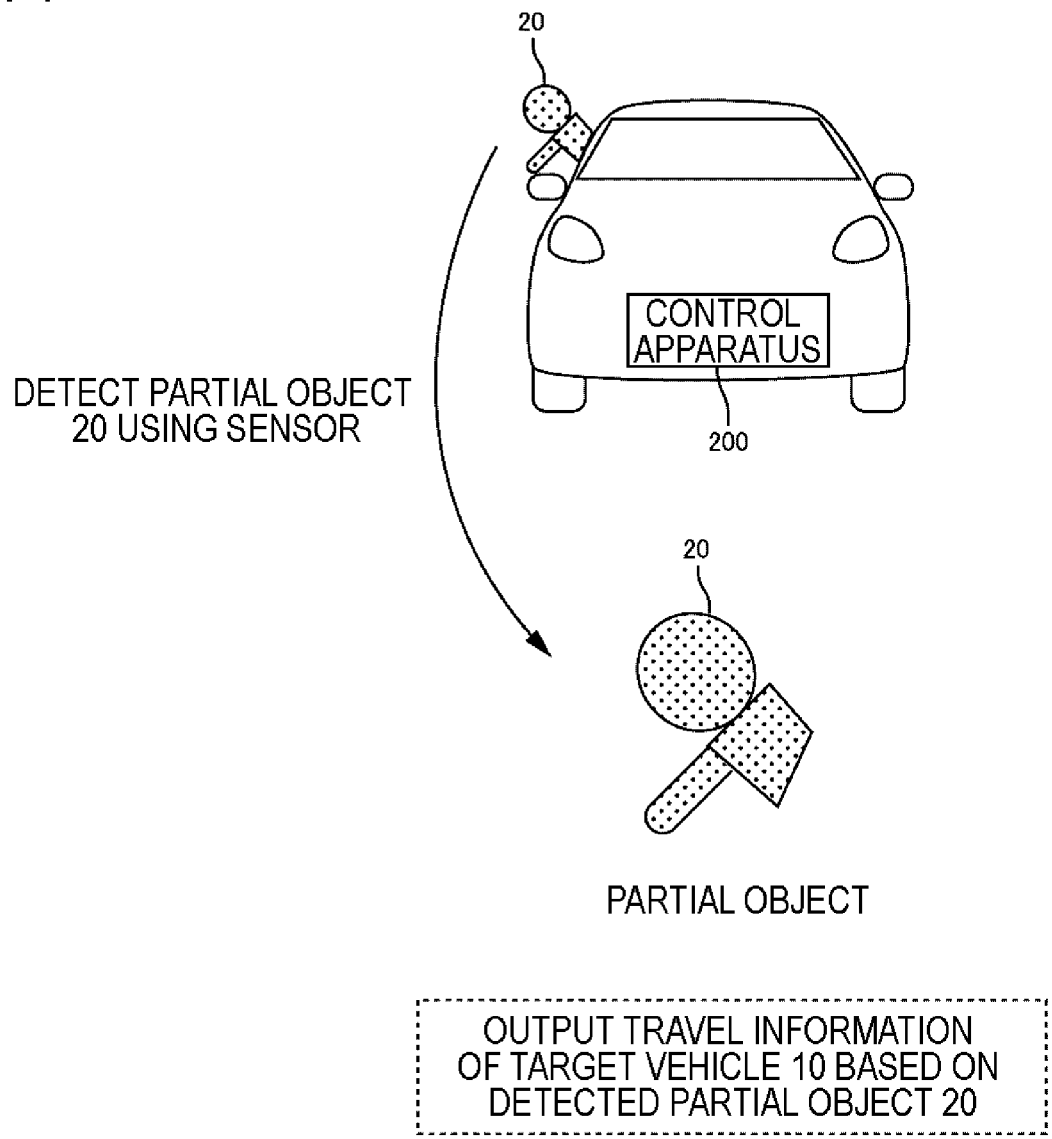
FIG. 1 is a diagram for illustrating an outline of a control apparatus in an Embodiment 1.

Hereinafter, embodiments of the present invention will be described with reference to the drawings. In all the drawings, the same reference numerals will be given to the same configuration elements, and description thereof will not be repeated as appropriate. In addition, unless otherwise described, each block in the block diagram represents a functional unit configuration, not a hardware unit configuration.

<Overview>

FIG. 1 is a diagram for illustrating an outline of a control apparatus 200 in an Embodiment 1. The description below using FIG. 1 is an example for facilitating the understanding of the operation of the control apparatus 200, and does not limit the operation of the control apparatus 200.

The control apparatus 200 is an apparatus that outputs information (hereinafter, travel information) relating to travel of a target vehicle 10. The travel information is control information for controlling the travel of the target vehicle 10, for example. The travel control of the target vehicle 10 includes, for example, a control of the velocity and a traveling route of the target vehicle 10. In addition, for example, the travel information includes notification information indicating that the travel situation of the target vehicle 10 is in a dangerous situation (an accident is more likely to occur than usual). Details of the travel information and how to use the travel information will be described later.

When the control information is output by the control apparatus 200, the target vehicle 10 is a vehicle in which at least a part of the travel is controlled by the control apparatus 200. For example, the target vehicle 10 is an autonomous driving vehicle. However, when the control information is output by the control apparatus 200, as long as the target vehicle 10 is a vehicle in which at least a part of the travel is controlled by the control apparatus 200, the target vehicle is not limited to the autonomous driving vehicle. For example, the target vehicle 10 may be a vehicle controlled by the control apparatus 200 only in an emergency where there is a risk of a collision.

The control apparatus 200 detects a partial object 20 using a sensor. The partial object 20 is a part of an object (hereinafter referred to as an associated object) riding on the target vehicle 10, and is the part that juts outside the target vehicle 10. The associated object is a person or a thing riding on the target vehicle 10. Specifically, the associated object is a passenger of the target vehicle 10 or a baggage loaded on the target vehicle 10.

If the passenger's body or the baggage juts outside the target vehicle 10 (for example, if the passenger is getting out of the window or if the baggage is protruding from the loading platform), the passenger or the baggage jutting outside the target vehicle 10 is detected as the partial object 20. On the other hand, when the passenger's body and the baggage do not jut outside the target vehicle 10, the partial object 20 is not detected.

The control apparatus 200 outputs the travel information of the target vehicle 10 based on the detected partial object 20. For example, if the size of the partial object 20 is large, the passenger or the baggage may collide with surrounding signs or the like. Therefore, the control apparatus 200 outputs the travel information in such a case. For example, the control apparatus 200 decreases the velocity of the target vehicle 10 by outputting the control information to decrease the velocity of the target vehicle 10.

According to the control apparatus 200 in the present embodiment, the partial object 20 is detected by the sensor, and the travel information relating to the travel of the target vehicle 10 is output according to the detected partial object 20. Here, by detecting the partial object 20, dangerous situations that dynamically occur such as passengers coming out of the window, the baggage sticking out of the loading platform or out of the window (for example, the baggage in the truck collapses), can be recognized. As described above, when the passenger's body juts outside the window or the baggage protrudes from the loading platform, there is a risk that the passenger or the baggage collides with the wall, or the like even if there is no problem with the content of driving.

According to the control apparatus 200 in the present embodiment, the occurrence of a dangerous situation that can dynamically occur is recognized even in a situation where there is no problem in the content of driving the travel information is output. For example, as a result, the travel of the target vehicle 10 is controlled, or a warning indicating that the target vehicle 10 is in a dangerous situation is given. In this way, it is possible to realize the safe travel of the vehicle.

Hereinafter, the control apparatus 200 in the present embodiment will be described in further detail.

<Example of Functional Configuration of Control Apparatus 200>

Figure 2:
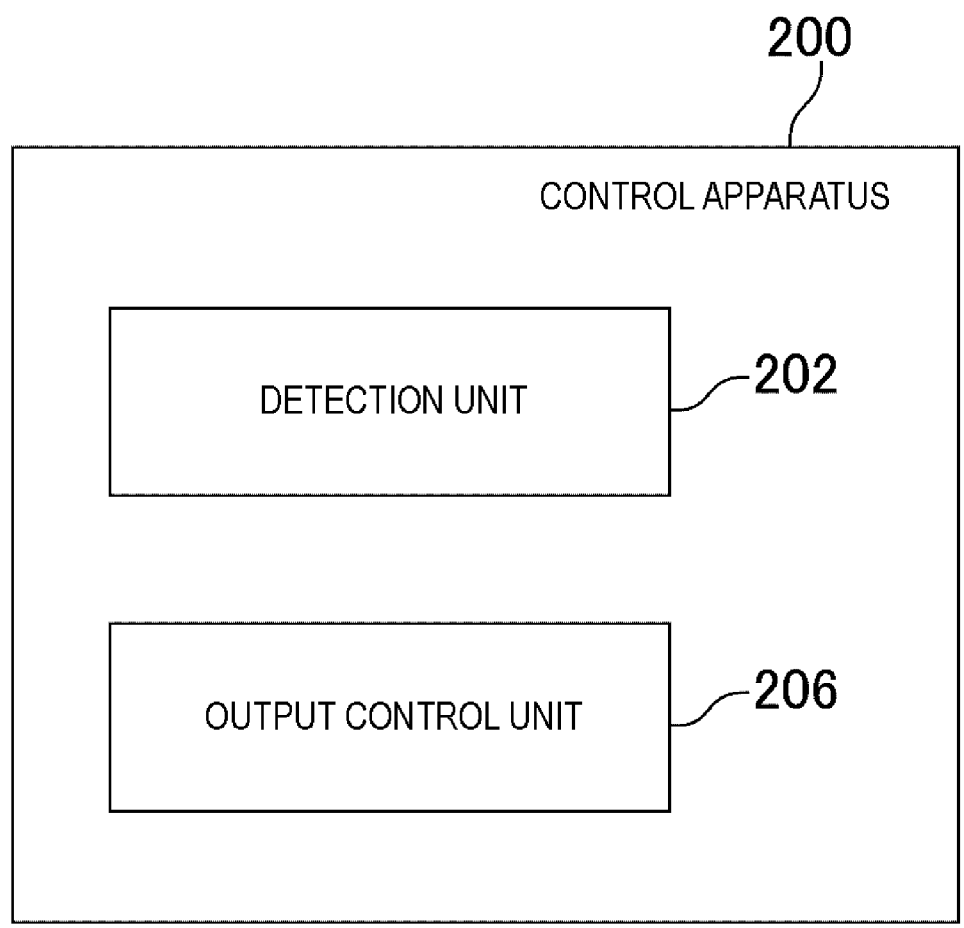
FIG. 2 is a block diagram illustrating a functional configuration of the control apparatus according to the Embodiment 1.

The control apparatus 200 is configured to include, for example, each functional configuration unit illustrated in FIG. 2. FIG. 2 is a block diagram illustrating a functional configuration of the control apparatus 200 according to the Embodiment 1. The control apparatus 200 includes a detection unit 202 and an output control unit 206. The detection unit 202 detects the partial object 20 using the sensor. The output control unit 206 outputs the travel information of the target vehicle 10 based on the detected partial object 20.

<Example of Hardware Configuration of Control Apparatus 200>

Each functional configuration unit of the control apparatus 200 may be realized by hardware (for example, a hard-wired electronic circuit) that realizes each functional configuration unit, or may be realized by a combination of hardware and software (for example, a combination of an electronic circuit and a program for controlling the circuit). Hereinafter, the case where each functional configuration unit of the control apparatus 200 is realized by the combination of the hardware and the software will be further described.

Figure 3:
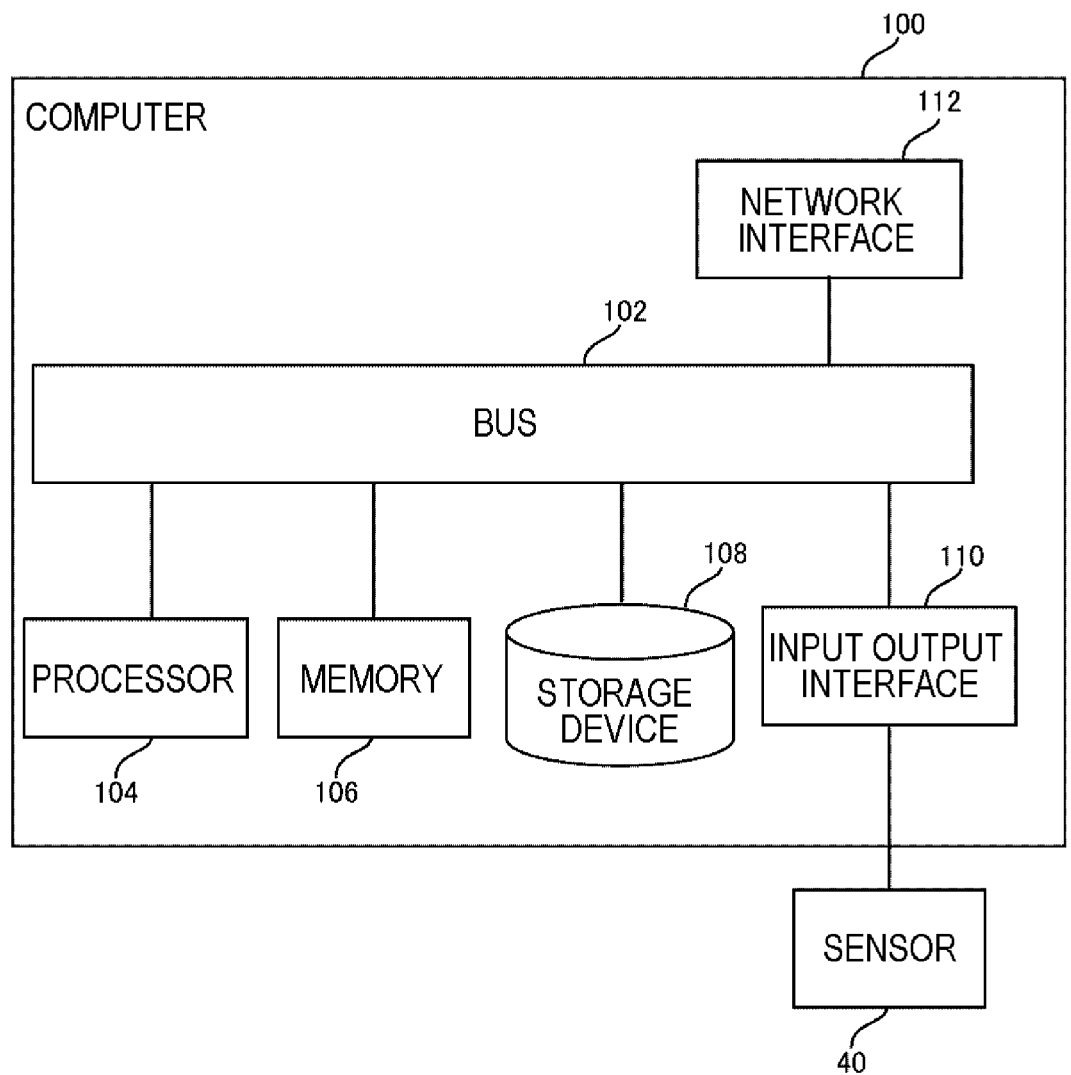
FIG. 3 is a diagram illustrating a hardware configuration of the control apparatus.

FIG. 3 is a diagram illustrating a hardware configuration of the control apparatus 200. A computer 100 is a computer that realizes the control apparatus 200. For example, the computer 100 is an electronic control unit (ECU) that controls an engine of the target vehicle 10. The computer 100 may be a computer designed exclusively for realizing the control apparatus 200, or may be a general-purpose computer. However, the computer 100 that realizes the control apparatus 200 is not limited to the ECU, and may be any computer. For example, the computer 100 that realizes the control apparatus 200 is a car navigation apparatus.

The computer 100 includes a bus 102, a processor 104, a memory 106, a storage device 108, an input output interface 110, and a network interface 112. The bus 102 is a data transmission path for the processor 104, the memory 106, the storage device 108, the input output interface 110, and the network interface 112 to transmit and receive the data to and from each other. However, the method of connecting the processors 104 and the like is not limited to the bus connection. The processor 104 is an operation processing apparatus realized by using a microprocessor or the like. The memory 106 is a main memory apparatus realized by using a random access memory (RAM) or the like. The storage device 108 is an auxiliary storage device realized using a read only memory (ROM), a flash memory, or the like.

The input output interface 110 is an interface for connecting the computer 100 to peripheral devices. In FIG. 3, the sensor 40 is connected to the input output interface 110. The sensor 40 is a sensor used for detecting the partial object 20.

For example, various analog signals and digital signals used for controlling the target vehicle 10 are input to or output from the computer 100 via the input output interface 110. Here, the input output interface 110 appropriately includes an A/D converter that converts an analog input signal into a digital signal, and a D/A converter that converts a digital output signal into an analog signal, and the like.

The network interface 112 is an interface for connecting the computer 100 to a communication network. This communication network is, for example, a controller area network (CAN) communication network. The method of connecting the network interface 112 to the communication network may be a wireless connection or may be a wired connection.

The computer 100 may include a plurality of network interfaces 112. For example, the computer 100 includes a network interface 112 for connecting to a CAN communication network and a network interface 112 for connecting to a wide area network (WAN) communication network. For example, the computer 100 acquires various information from a server apparatus via the WAN communication network.

The storage device 108 stores program modules for realizing each functional configuration unit of the control apparatus 200. The processor 104 realizes the function of the control apparatus 200 by reading out the program module to the memory 106 and executing the program module.

<Regarding Sensor 40>

Various devices can be used as the sensor 40. For example, the sensor 40 is a camera. The camera may be provided at any places. For example, the sensor 40 is provided near the side view mirror of the target vehicle 10. For example, it is possible to recognize a dangerous situation in which the passenger's body is coming out of the right side window using a captured image generated by a camera installed near the right side view mirror on the right side of the target vehicle 10. Similarly, if a camera is provided near the side view mirror on the left side of the target vehicle 10, it is possible to recognize the dangerous situation in which the passenger's body is coming out of the right side window using the captured image generated by the camera. In addition, as another example, the camera is installed on the roof portion of the target vehicle 10. For example, it is possible to recognize the dangerous situation in which the passenger's body is coming out of the sunroof using a captured image generated by a camera installed on the roof portion of the target vehicle 10. In addition, as another example, the camera may be installed near fender mirrors or on an engine hood.

The camera used as the sensor 40 may be a monocular camera or a stereo camera. In addition, if the sensor 40 is a monocular camera, a combination of the monocular camera and a line laser may be used as the sensor 40. A method of using the line laser will be described later.

In addition, for example, a distance measuring device such as a Light Detection and Ranging (LIDAR) sensor can be used as the sensor 40. The distance measuring device can be installed at any places, and similarly to the camera described above, for example, may be installed at any places such as near the side view mirror of the target vehicle 10, on the roof portion of the target vehicle 10, near the fender mirror, or on the engine hood.

In addition, for example, the sensor 40 may be a sensor that detects the presence of an object, such as an infrared sensor. For example, such sensor is installed on the window or on the loading platform such that the passenger or the baggage that protrudes outside the window or the loading platform can be detected.

<Installation Example of Control Apparatus 200>

Figure 4:
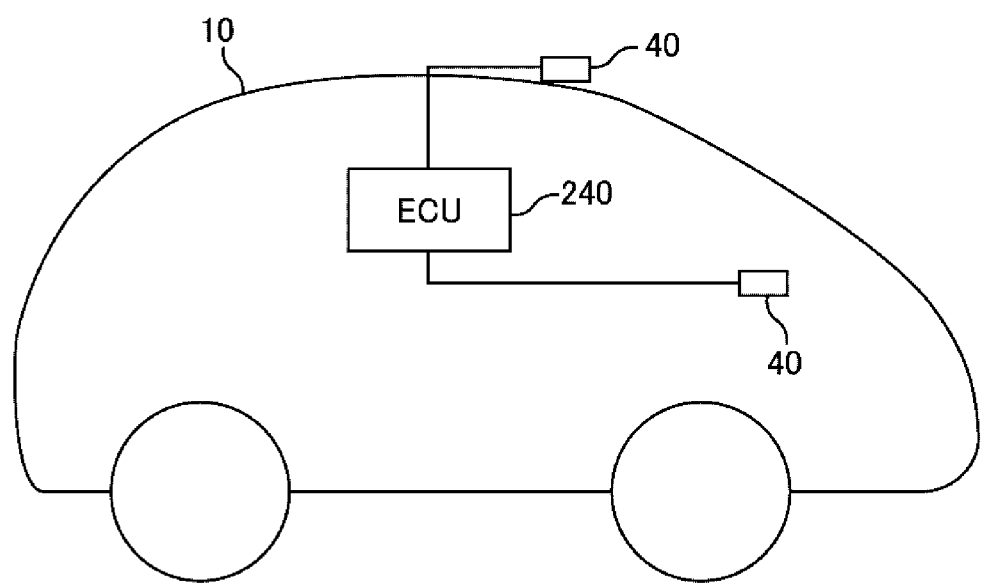
FIG. 4 is a diagram illustrating the control apparatus installed in a target vehicle.

For example, the control apparatus 200 is installed in the target vehicle 10. FIG. 4 is a diagram illustrating the control apparatus 200 installed inside the target vehicle 10. The ECU 240 is an example of a computer 100 that realizes the functions of the control apparatus 200. The target vehicle 10 is at least partially controlled by the ECU 240. For example, the travel of the target vehicle 10 is controlled by controlling mechanisms such as a gear, an engine, and a steering. An existing technology can be used as a technology for controlling various mechanisms provided in the vehicle based on a control method decided by the ECU.

<Flow of Processing>

Figure 5:
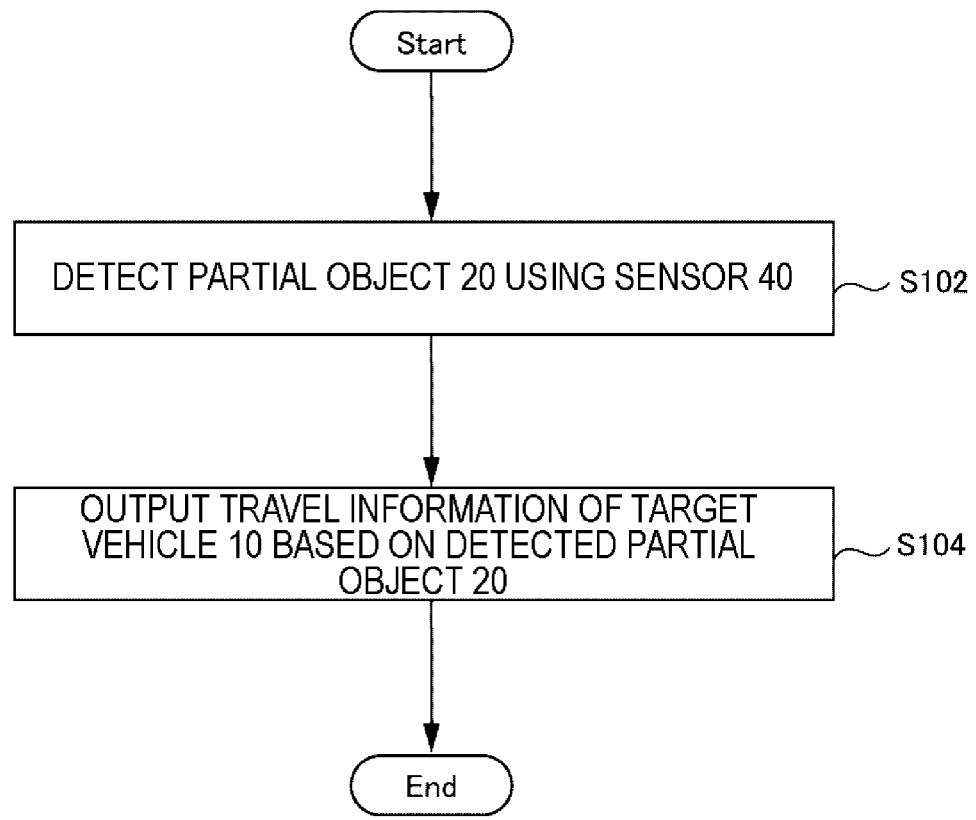
FIG. 5 is a flowchart illustrating a flow of processing performed by the control apparatus in the Embodiment 1.

FIG. 5 is a flowchart illustrating the flow of processing performed by the control apparatus 200 in the Embodiment 1. The detection unit 202 detects the partial object 20 using a result of detection by the sensor (S102). The output control unit 206 outputs travel information based on the detected partial object 20 (S106).

The control apparatus 200 performs a series of processing illustrated in FIG. 5 at any timing. For example, the control apparatus 200 performs the series of processing illustrated in FIG. 5 at a predetermined cycle. However, the control apparatus 200 may perform the series of processing only when a predetermined condition is satisfied. For example, in order for a person or an object to jut outside the target vehicle 10, a part of the target vehicle 10 (for example, a door, a window, or a sunroof) needs to be open. Therefore, for example, the control apparatus 200 may perform the series of processing only when it is detected that a predetermined place (the door, the window, the sunroof, or the like) of the target vehicle 10 is open. An existing technology can be used as a technology for detecting that the door, the window, the sunroof, or the like is open.

<Detection of Partial Object 20: S102>

The detection unit 202 detects the partial object 20 using the sensor 40. The method of detecting the partial object 20 differs depending on what is used as the sensor 40. Hereinafter, examples of a specific method for detecting the partial object 20 will be described regarding three cases: 1) a case of using the sensor 40 capable of detecting a three-dimensional position, 2) a case of using a monocular camera as the sensor 40, and 3) a case of using a line laser together with a monocular camera.

<<Case of Using Sensor 40 Capable of Detecting Three-Dimensional Position>>

For example, it is assumed that the sensor 40 is a sensor that can detect the three-dimensional position of an object included in the detection range, such as a stereo camera or a distance measuring device. In this case, the detection unit 202 acquires 3D point cloud data as a result of detection performed by the sensor 40. The 3D point cloud data indicates three-dimensional coordinates of each position of the object included in the detection range of the sensor 40. An origin of the three-dimensional coordinates is a position of the sensor 40, for example. Existing technologies can be used for the technologies for obtaining the 3D point cloud data from the result of detection performed by the stereo cameras or the distance measuring device. Hereinafter, data indicating the three-dimensional coordinates of a certain point is referred to as point data. That is, the 3D point cloud data is a set of point data representing the coordinates of each position of the object included in the detection range of the sensor 40.

The detection unit 202 extracts the point data constituting an area representing the target vehicle 10 or an associated object from the 3D point cloud data. Hereinafter, the area representing the target vehicle 10 or the associated object is referred to as a foreground area, and the other area is referred to as a background area. In other words, the detection unit 202 extracts the foreground area from the 3D point cloud data.

In order to extract the foreground area, for example, the detection unit 202 clusters the point data included in the 3D point cloud data based on a distance between the point data. Specifically, the detection unit 202 clusters the point data that are close to each other. A known method can be used for clustering the point data.

Here, as pre-processing for the clustering described above, the detection unit 202 may perform processing for excluding the point data which is departed from the target vehicle 10 by a predetermined distance, from the 3D point cloud data. The distance between the target vehicle 10 and each point can be computed based on a positional relationship between the target vehicle 10 and the sensor 40, an angle of view of the sensor 40, and the like.

The detection unit 202 determines equal to or more than one clusters representing the foreground area from the clusters generated by the clustering described above. For example, the cluster representing the foreground area is a cluster that satisfies a condition that "the distance to the target vehicle 10 is within a predetermined distance". Furthermore, the cluster representing the foreground area may be a cluster that satisfies a condition that "moves along with the target vehicle 10 over time".

When using the latter condition, the detection unit 202 generates the cluster from each of a plurality of 3D point cloud data detected by the sensor 40 at different times. For example, when the sensor 40 performs detection processing at a predetermined time interval and generates the 3D point cloud data representing the result of each detection processing, the detection unit 202 performs clustering for each of a plurality of 3D point cloud data continuous in time series. Thereafter, the detection unit 202 compares the clusters obtained from each of the plurality of 3D point cloud data, and associates the clusters representing substantially the same area with each other.

Here, a distance between a movement vector of the area represented by a plurality of corresponding clusters (a plurality of clusters representing substantially the same area) and a basic movement vector of the foreground is significantly shorter than a distance between a basic movement vector of the background and a basic movement vector of the foreground, that area can be considered to be an area representing the associated object moving associated with the target vehicle 10. Therefore, the detection unit 202 determines whether or not the distance between the movement vector of the area represented by the cluster and the basic movement vector of the foreground is shorter than the distance between the basic movement vector of the background and the basic movement vector of the foreground (for example, whether or not the value obtained by dividing the former by the latter is equal to or less than the predetermined value), and if the distance is shorter, that cluster is determined as a cluster representing the foreground area.

The basic movement vector of the foreground is a movement vector of an object to be detected by the sensor 40 when the object moving together with the target vehicle 10 is stationary on the target vehicle 10. If the position of the sensor 40 is fixed on the target vehicle 10, the movement vector of the object moving together with the target vehicle 10, that is, the basic movement of the foreground is a zero vector.

The basic movement vector of the background is a movement vector to be detected by the sensor 40 when the background object is stationary with respect to a map. In other words, the basic movement vector of the background represents a distance and a direction in which the stationary background moves on the coordinate system of the sensor 40 due to the movement of the target vehicle 10 (movement of the coordinate system of the sensor 40). For example, it is assumed that a surrounding object is detected by the sensor 40 fixed toward the front of the target vehicle 10. In this case, when the target vehicle 10 moves 5 m ahead, the stationary background is 5 m closer to the sensor 40 from the front (translational movement). In addition, when the target vehicle 10 rotates for traveling through a curve, the background in the coordinate system of the sensor 40 also rotates according to the rotation. For example, if the target vehicle 10 rotates 10 degrees to the left for traveling through a left curve, the stationary background rotates 10 degrees to the right around the position of the target vehicle 10 (rotational movement). In the case of the rotational movement, the size and the direction of the basic movement vector of the background vary depending on the distance from the target vehicle 10. The basic movement vector of the background can be computed from an amount of rotation and the positional relationship between the background and the target vehicle 10. Actually, the basic movement vector of the background is represented by a combination of the above-described vector representing the translational movement and the vector representing the rotational movement.

When the sensor 40 is a sensor that measures the surroundings while rotating, a size of the basic movement vector of the background varies depending on the three-dimensional position of the background. Specifically, the size of the basic movement vector of the background is small at a place close to the sensor 40, and the size of the basic movement vector of the background is large at a place far from the sensor 40.

In addition, an amount of movement of the target vehicle 10 can be estimated from, for example, the velocity of the vehicle and the steering angle. In addition, for example, since most of the objects in the background are considered to be stationary, the amount of movement of the target vehicle 10 may be estimated from the movement vector information of a large number of objects detected by the sensor 40. A known method can be used for this estimation processing.

The detection unit 202 determines the area representing the partial object 20 by computing a difference between the foreground area and the area representing the target vehicle 10. Hereinafter, among the areas detected by the sensor 40, the area representing the target vehicle 10 is referred to as a reference area. Which part of the area detected by the sensor 40 is the reference area can be defined in advance from the positional relationship between the target vehicle 10 and the sensor 40 and the angle of view of the sensor 40.

Here, the reference area may be represented by a coordinate system different from that of the 3D point cloud data. For example, the reference area is defined as a part of the shape of the target vehicle 10 in a substantial plan view from the traveling direction of the target vehicle 10. When the reference area and the 3D point cloud data are expressed in the coordinate systems different from each other, the detection unit 202 performs pre-processing for matching those coordinate systems. For example, the detection unit 202 converts each point data representing the foreground area into the coordinate system of the reference area. Conversely, the detection unit 202 may convert the coordinate system representing the reference area into the coordinate system of the 3D point cloud data.

The reference area may be defined using any methods. For example, the sensor 40 is operated during the normal time (such as when parked) to obtain the 3D point cloud data of the target vehicle 10, and then, the area represented by the 3D point cloud data is handled as a reference area. In addition, for example, the reference area may be computed by a computation using data defining the specification of the target vehicle 10 (for example, design data of the target vehicle 10), the angle of view of the sensor 40, and the positional relationship between the sensor 40 and the target vehicle 10.

However, the sensor 40 may be installed such that the target vehicle 10 is not included in the detection range. In this case, the detection unit 202 determines the foreground area as the partial object 20. Accordingly, it is not necessary to compute the difference between the foreground area and the reference area, and it is not necessary to define the reference area.

<<Case of Using Monocular Camera>>

The detection unit 202 acquires the captured image generated by the monocular camera as a result of detection performed by the sensor 40. The detection unit 202 performs processing for excluding at least a part of the background area from the captured image as pre-processing (however, this pre-processing may not be performed). For example, the detection unit 202 handles an area that changes over time in accordance with the motion of the target vehicle 10 as the background area. In this case, the detection unit 202 uses a plurality of captured images generated by the sensor 40 in time series.

The movement of the target vehicle 10 can be estimated from information on changes of the camera video images (a plurality of images captured in time series) and a behavior of the vehicle obtained from the target vehicle 10. Furthermore, the motion of the background area on the camera video images can be estimated from the estimated motion of the target vehicle 10. For example, this estimation can be realized by using a technology used in Structure from Motion, Visual SLAM, and the like. For example, when the direction of the target vehicle 10 changes such as when the vehicle travels through a curve, an image area that changes greatly in accordance with the motion of the target vehicle 10 can be handled as a background area.

After the pre-processing, the detection unit 202 detects the partial object 20 from the captured image. Hereinafter, examples of three methods thereof will be described.

<<<Method 1 for Detecting Partial Object 20>>>

For example, the detection unit 202 determines the image area of the object positioned in front of the target vehicle 10 (shown so as to hide the target vehicle 10) from the captured image as an image area representing all or a part of the associated object. In this case, in order to detect the target vehicle 10 from the captured image, a template image representing the target vehicle 10 is defined in advance.

For example, the detection unit 202 determines the above-described determined image area as an image area representing the partial object 20. In addition, for example, in addition to the above-described determined image area, the detection unit 202 also determines an image area having a predetermined relationship with the image area as an image area representing the partial object 20. The predetermined relationship is, for example, a relationship in which "an image area has continuity with the above-described determined image area" or a relationship in which "an image area of which the temporal change of the distance to the above-described determined image area is small (the image area has moved along with the above-described determined image area in response to the temporal change)".

For example, if the vehicle's window frame or a center pillar is hidden by a certain object, it can be assumed that the object is a part of the passenger or the baggage that juts outside the window. Furthermore, the image area that has continuity with the image area representing "a part of the passenger or baggage", the image area of which the temporal change of the distance to the image area representing a part of the passenger or the baggage is small (the image area moving along with the image area representing "a part of the passenger or the baggage") can be estimated as the image area representing the remaining part of the passenger or the baggage. Therefore, the detection unit 202 determines the image area representing the partial object 20 using the method described above.

<<<Method 2 for Detecting Partial Object 20>>>

For example, the detection unit 202 detects the image area representing the partial object 20 by performing object recognition on the captured image. For example, the detection unit 202 detects an image area representing a human body (for example, an image area representing a hand or a face) from the captured image. Here, an existing technology can be used as a technology for detecting the human body by performing the object recognition.

Then, if the image area representing the detected human body satisfies a predetermined condition, the detection unit 202 determines the image area as the image area representing the partial object 20. For example, the predetermined condition is a condition that "the size of a hand or a face is equal to or larger than a predetermined size". That is because, since the associated object is positioned near the sensor 40, the captured image of the associated object is included in the captured image in a size larger than that of a person walking on a sidewalk or the like (object included in the background area). An existing technology can be used for a technology for recognizing a part of the body such as the hands and faces.

In addition, for example, the predetermined condition is a condition of "adjacent to the target vehicle 10". For example, when the passenger puts out his/her arm from the window of the target vehicle 10, the arm coming out of the window adjacent to the target vehicle 10 appears in the captured image.

It is assumed that the human body detected from a captured image by performing the object recognition is only a characteristic part such as a hand or a face. In this case, the detection unit 202 first determines whether or not the image area representing the detected part is the image area representing the object 20 using the method described above. Then, if it is determined that the image area representing the detected part is the image area representing the object 20, the detection unit 202 determines the image area that has continuity with the image area of the detected hand and face and also the image area that moves associated with the image area of the hand and face, as the image area representing the partial object 20. However, the detection unit 202 may determine only the image area detected by performing the object recognition as the image area representing the partial object 20.

<<<Method 3 for Detecting Partial Object 20>>>

For example, the detection unit 202 detects the partial object 20 by detecting a shadow appeared on the target vehicle 10 in the captured image. The position of the partial object 20 can be estimated from a position of the shadow on the target vehicle 10 and an incident angle of sunlight. The incident angle of the sunlight can be determined based on, for example, the position of the target vehicle 10 (such as GPS coordinates) and date and time information. An existing technology can be used as a technology for computing the position and shape of the object that is the source of the shadow based on the shadow and the incident angle of the sunlight.

Here, in the above-described method using the monocular camera, the two-dimensional shape of the partial object 20 is determined. In addition, the detection unit 202 may estimate the three-dimensional shape of the partial object 20 by estimating the position of the partial object 20 in the depth direction using various methods described below. In this way, for example, it is possible to know the row of the seats where the passenger whose body is coming out of the target vehicle 10 is sitting or the position where the baggage protruding from the target vehicle 10 is loaded.

For example, the detection unit 202 determines the position of the partial object 20 in the depth direction using a prior knowledge about the size of the associated object and the configuration of the target vehicle 10. For example, the relationship between the size of the parts of the reference human body (the face, hands, arms, and the like) and the position in the depth direction corresponding to the size is defined in advance. Then, the detection unit 202 estimates the position of the passenger in the depth direction, that is, the position of the partial object 20 in the depth direction based on the size of each part of the passenger's body included in the captured image, a ratio of the above-described each size to the size of each part of the standard human body, and the position in the depth direction corresponding to each part of the reference human body.

In addition, for example, the detection unit 202 may roughly estimate the position of the partial object 20 in the depth direction from the positional relationship between the partial object 20 and characteristic configuration element of the target vehicle 10 (for example, a center pillar or a window). For example, if the center pillar or the window in the first row is not hidden by the partial object 20 and the frames behind the second row is hidden, it can be estimated that the partial object 20 is positioned in the second row of the target vehicle 10.

<<Case of Using Laser in Addition to Monocular Camera>>

Figure 6:
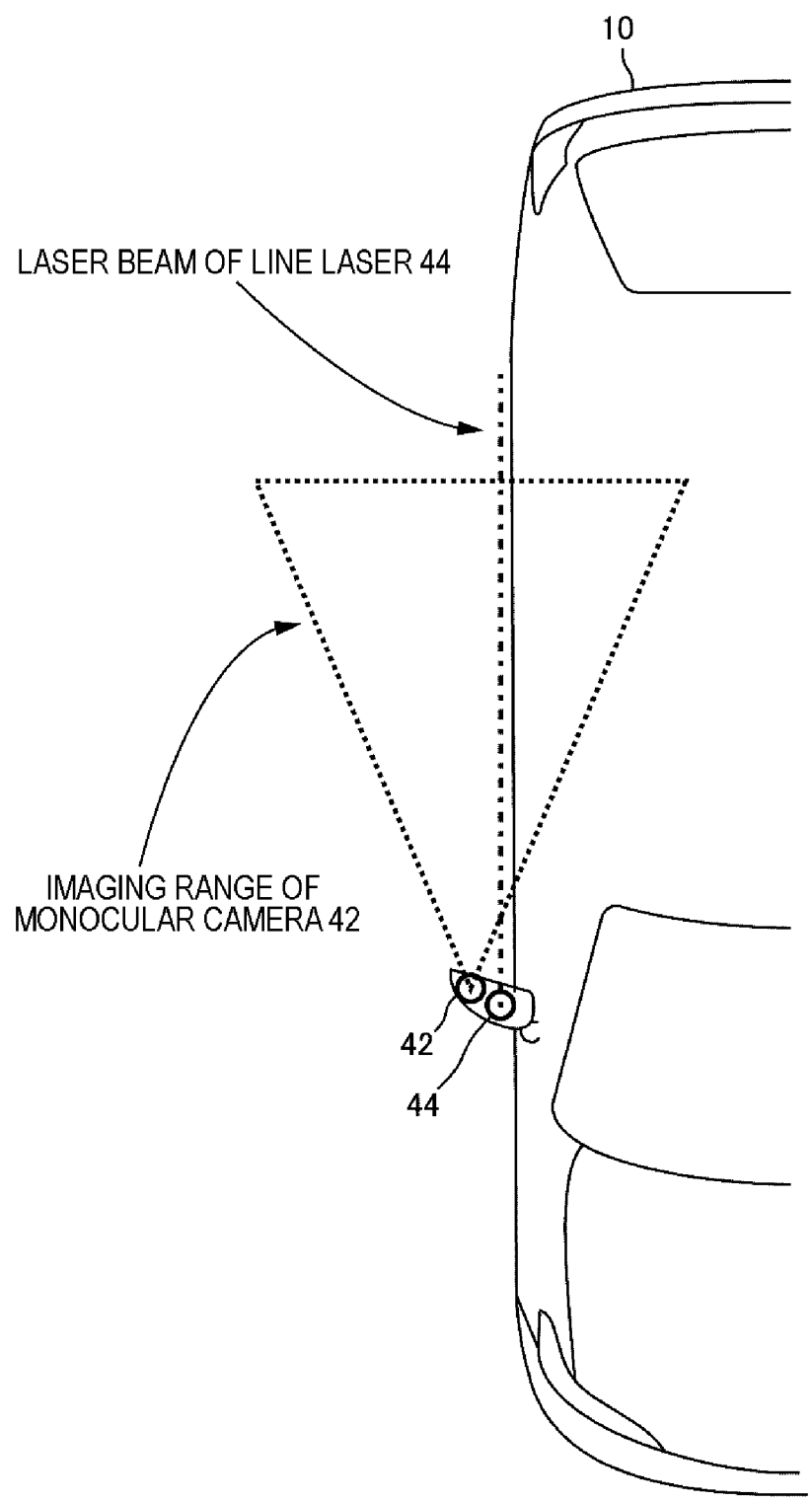
FIG. 6 is a diagram illustrating the target vehicle on which both a monocular camera and a line laser are installed.

It is assumed that a line laser is used as the sensor 40 in addition to the monocular camera described above. FIG. 6 is a diagram illustrating the target vehicle 10 on which both the monocular camera and the line laser are installed. In FIG. 6, both the monocular camera 42 and the line laser 44 are installed in the vicinity of the side view mirror at the right side of the target vehicle 10. The laser beam emitted from the line laser 44 is emitted so as to spread in a substantially vertical direction and not to spread in a substantially horizontal direction. That is, the laser beam that forms a straight line in a substantially vertical direction is emitted.

The monocular camera 42 images a scene in a state in which the line laser 44 is emitted. Therefore, in the object included in the captured image generated by the monocular camera 42, the portion irradiated with the laser beam is relatively brighter than the other portions. The wavelength of the laser emitted from the line laser 44 is assumed to be a wavelength that can be sensed by the image sensor of the monocular camera 42.

In addition, in the captured image generated by the monocular camera 42, the horizontal position of the place irradiated with the laser beam is closer to the center of the captured image as the position in the depth direction of the place is farther from the monocular camera 42.

Therefore, the detection unit 202 detects the partial object 20 as follows. First, the detection unit 202 detects the image area representing the partial object 20 from the captured image using the method described in "a case of using a monocular camera". Then, the detection unit 202 determines the image area that is irradiated with the laser beam from the line laser 44 from the image area. The existing technology can be used as the technology for determining the image area that is irradiated with the laser beam from the captured image in which the object irradiated with the laser beam is imaged.

The detection unit 202 determines the position of the image area in the depth direction, eventually, the position of the partial object 20 in the depth direction, based on the horizontal position on the captured image of the image area irradiated with the laser beam. Here, the relationship between the horizontal position of the image area irradiated with the laser beam on the captured image and the position of the object represented by the image area in the depth direction can be defined in advance by the angle of view of the monocular camera 42 and the angle of view the line laser 44, and the positional relationship between the monocular camera 42 and the line laser 44. Therefore, for example, a conversion formula for converting the horizontal position of the image area irradiated with the laser beam on the captured image into the position of the object represented by the image area in the depth direction is defined in advance. The detection unit 202 obtains the position of the partial object 20 in the depth direction by applying the horizontal position of the image area irradiated with the laser beam on the captured image detected from the captured image to the conversion formula.

By installing a plurality of line lasers 44 or changing the emitting direction of the line laser 44, the positions of a plurality of areas on the partial object 20 in the depth direction may be determined.

<Output of Travel Information Based on Partial Object 20: S104>

The output control unit 206 outputs the travel information based on the partial object 20 detected by the detection unit 202 (S104). As described above, the travel information is the control information for controlling the travel of the target vehicle 10 and the notification information indicating the information relating to the partial object 20. The notification information is used for the purpose of notifying the passenger of the fact that the travel situation of the target vehicle 10 is in a dangerous situation. Hereinafter, each information will be described in detail.

<<Control Information>>

The output control unit 206 outputs information for controlling the travel of the target vehicle 10 (hereinafter, control information). For example, 1) velocity control, 2) travel position control on the road, and 3) traveling route control are performed. All of these controls may be performed, or only one or two of the controls may be performed.

For example, travel of the target vehicle 10 can be controlled by transmitting a control signal to a drive circuit of various mechanisms (throttle, steering, and the like) of the target vehicle 10. Therefore, for example, the output control unit 206 controls the travel of the target vehicle 10 by transmitting the control signal to the drive circuit for realizing the desired control. In addition, for example, an apparatus (hereinafter referred to as a travel control apparatus) for controlling the drive circuit may be separately provided inside the target vehicle 10. In this case, the output control unit 206 transmits the control information indicating the content of the travel control of the target vehicle 10 (for example, velocity to be set for the target vehicle 10) to the travel control apparatus. The travel control apparatus controls the travel of the target vehicle 10 by transmitting the control signal to the drive circuit for realizing control of the content indicated by the received control information.

Hereinafter, a method for controlling the travel of the target vehicle 10 in response to the detection of the partial object 20 will be described in detail. The description below is described under an assumption that the travel control of the target vehicle 10 is performed by the output control unit 206.

<<<Control of Velocity>>>

For example, the output control unit 206 controls the velocity of the target vehicle 10 in response to the detection of the partial object 20. For example, when the partial object 20 is detected, the output control unit 206 decreases the velocity of the target vehicle 10 to a predetermined velocity or stops the target vehicle 10. In addition, when the target vehicle 10 is stopped, the output control unit 206 may cause the target vehicle 10 not to start moving while the partial object 20 is detected.

In addition, for example, the output control unit 206 controls the velocity of the target vehicle 10 based on the size of the partial object 20. For example, when the size of the partial object 20 is equal to or greater than a predetermined value, the output control unit 206 decreases the velocity of the target vehicle 10 (for example, makes the velocity equal to or lower than a predetermined velocity) or stops the target vehicle 10. In addition, when the target vehicle 10 is stopped, the output control unit 206 may cause the target vehicle 10 not to start moving when the size of the partial object 20 is equal to or greater than the predetermined value. In addition, for example, the range of the size of the partial object 20 and the velocity of the target vehicle 10 may be associated with each other in advance, and then, the velocity of the target vehicle 10 may be a velocity corresponding to the size of the partial object 20 detected by the detection unit 202.

Figure 7:
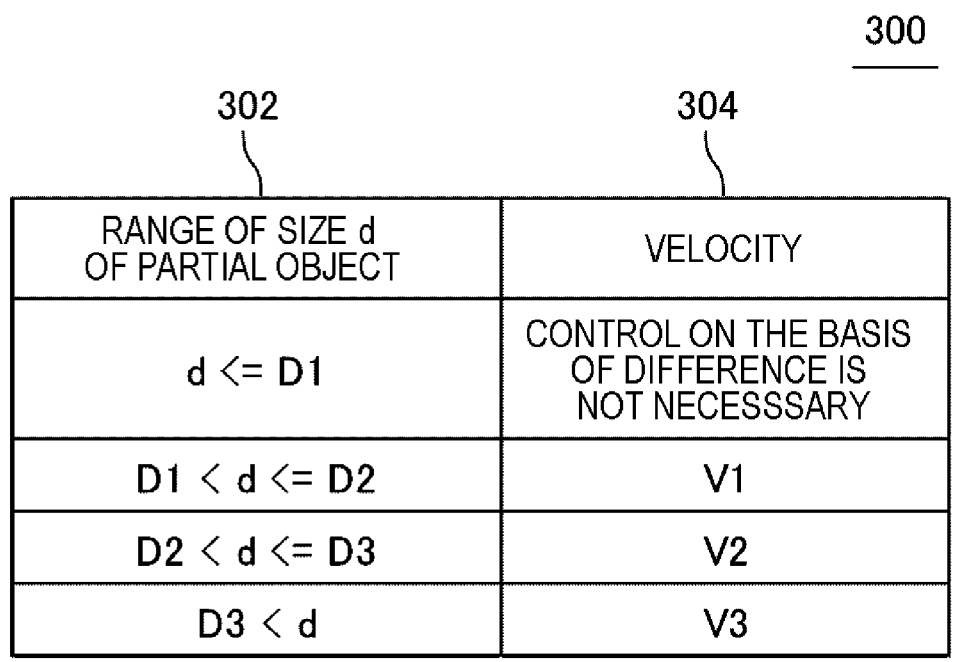
FIG. 7 is a diagram illustrating information in which a velocity of the target vehicle is associated with a range of a size of a partial object in a table format.

FIG. 7 is a diagram illustrating the information in which the velocity of the target vehicle 10 is associated with the range of the size of the partial object 20 in a table format. The table in FIG. 7 will be described as a table 300. In the table 300, a column 302 indicating the range of size of the partial object 20 is associated with a column 304 indicating the velocity of the target vehicle 10 corresponding to the range.

Here, various values can be handled as the above-described "size of the partial object 20". For example, the output control unit 206 handles the area of the area representing the partial object 20 as the size of the partial object 20. The increase of the area of the area representing the partial object 20 means that the passenger or the like protrudes largely from the target vehicle 10. Accordingly, by handling the area of the area representing the partial object 20 as the size of the partial object 20, the degree of danger can be represented by the size of the partial object 20.

In addition, for example, the output control unit 206 may compute a distance between the partial object 20 and the target vehicle 10 in a predetermined direction, and may set the distance as the size of the partial object 20. FIG. 8 are diagrams illustrating an example of the distance between the partial object and the target vehicle 10 in a predetermined direction.

Figure 8A:
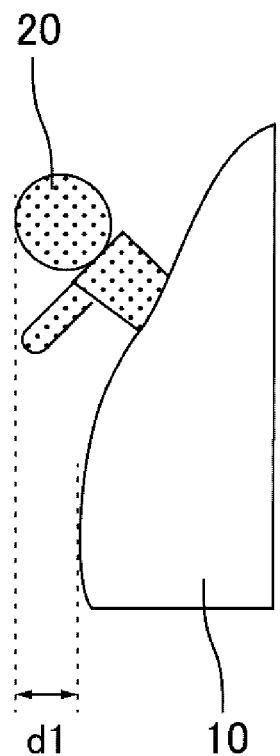
FIGS. 8A and 8B are diagrams illustrating an example of a distance between the partial object and a target vehicle 10 in a predetermined direction.

A partial object 20 in FIG. 8A is an associated object detected from the right side portion of the target vehicle 10. In this example, the size of the partial object 20 is a distance d1 between the right end of the partial object 20 and the right end of the target vehicle 10. In this way, a degree of protrusion of the passenger or the like from the target vehicle 10 in the horizontal direction is handled as the size of the partial object 20. In this case, if the passenger protrudes largely from the target vehicle 10 in the horizontal direction, there is a high probability that the passenger collides with a wall or an oncoming vehicle. Accordingly, it can be said that the larger the size of the passenger or the like protruding from the target vehicle 10 in the horizontal direction, the more the situation is dangerous. Therefore, by handling the distance d1 as the size of the partial object 20, the degree of danger can be represented by the size of the partial object 20.

Figure 8B:
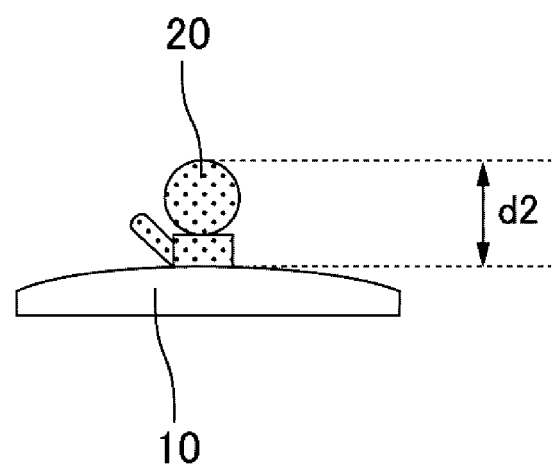

The partial object 20 in FIG. 8B is a shape of the upper portion of the target vehicle 10. In this example, the size of the partial object 20 is a distance d2 between an upper end of the partial object 20 and an upper end of the target vehicle 10. In this way, a degree of protrusion of the passenger or the like from the target vehicle 10 in the vertical direction is handled as the size of the partial object 20. In this case, if the passenger protrudes largely from the target vehicle 10 in the vertical direction, there is a high probability that the passenger collides with a ceiling of a tunnel or the like. Accordingly, it can be said that the larger the size of the passenger or the like protruding from the target vehicle 10 in the vertical direction, the more the situation is dangerous. Therefore, by handling the distance d2 as the size of the partial object 20, the degree of danger can be represented by the size of the partial object 20.

The size of the partial object 20 may be computed in consideration of the position of the partial object 20 in the depth direction. For example, the farther the camera is away from the partial object 20, the smaller the partial object 20 appears in the captured image. Therefore, for example, the relationship between the size of the partial object 20 and the position of the partial object 20 in the depth direction is defined in advance based on the information such as the camera position and the angle of view. Specifically, formula for computing the size of the partial object 20 in the real space is defined in advance based on the parameters (the area of the image area representing the partial object 20 and the distance between the partial object 20 and the target vehicle 10 on the captured image) representing the size of the partial object 20 obtained from the captured image, and the position of the partial object 20 in the depth direction. The detection unit 202 obtains the size of the partial object 20 in the real space by applying the parameter representing the size of the partial object 20 detected from the captured image and the position of the partial object 20 in the depth direction that is estimated using the various methods described above, to the above formula.

The output control unit 206 may control the velocity of the target vehicle 10 while taking the positional relationship between the partial object 20 detected by the detection unit 202 and the obstacles around the target vehicle 10 into consideration. For example, if the target vehicle 10 is stopped and there is an obstacle near the partial object 20 (the distance between the partial object 20 and the obstacle is equal to or shorter than the predetermined value), the output control unit 206 causes the target vehicle 10 not to start moving. The obstacle is detected using the sensors such as camera or the distance measuring device. An existing technology can be used as a technology for detecting the obstacle using the sensor.

In addition, it is assumed that the target vehicle 10 is traveling. In this case, for example, if the passenger's body is jutting outside of a sunroof and there is a tunnel having a low ceiling on the traveling route of the target vehicle 10, there is a problem in that the passenger may collide with the tunnel. In addition, not only on the upper part of the target vehicle 10 but also on the side surfaces (left and right in the traveling direction of the target vehicle 10), there is a possibility that the passenger and the baggage may protrude from the target vehicle 10 to collide with the obstacle. Therefore, the output control unit 206 recognizes the risk of the partial object 20 (associated object protruding from the target vehicle 10) colliding with the obstacle, and controls the velocity of the target vehicle 10 in accordance with the risk.

For example, the output control unit 206 detects the position and shape of the obstacle on the traveling route of the target vehicle 10 using a sensor (such as the camera or the distance measuring device) that senses the periphery of the target vehicle 10. The output control unit 206 determines whether or not the obstacle is positioned at the position where the partial object 20 travels (whether the associated object collides with the obstacle) or not based on the position and shape of the partial object 20 detected by the detection unit 202 and the position and shape of the obstacle. When the obstacle is positioned at the position where the partial object 20 travels, the output control unit 206 decreases the velocity of the target vehicle 10. An existing technology can be used as a technology for detecting the position and shape of the obstacle using the sensor.

In addition, for example, the output control unit 206 may determine the position and shape of the obstacle on the traveling route of the target vehicle 10 using the map information. In this case, the position and shape of objects installed on and around the road, such as tunnels, utility poles, and signs, are included in the map information.

<<<Control of Travel Position on Road>>>

For example, the output control unit 206 controls the travel position on the road based on the size and position of the partial object 20. For example, when the passenger's body is coming out of the right side of the target vehicle 10, the probability that the passenger collides with a wall or the like can be reduced by traveling to the left side of the road rather than usual.

Figure 9A:
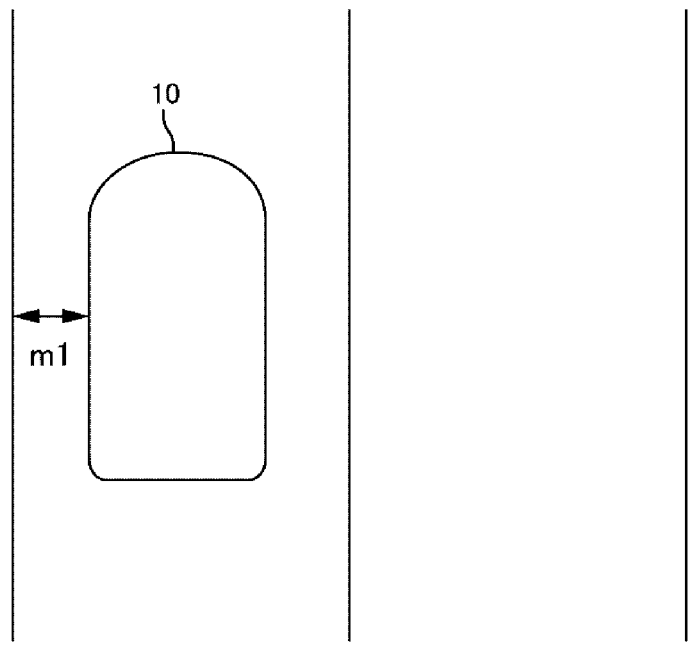
FIGS. 9A and 9B are diagrams illustrating a state in which a travel position on a road is controlled based on the size of the partial object.
Figure 9B:
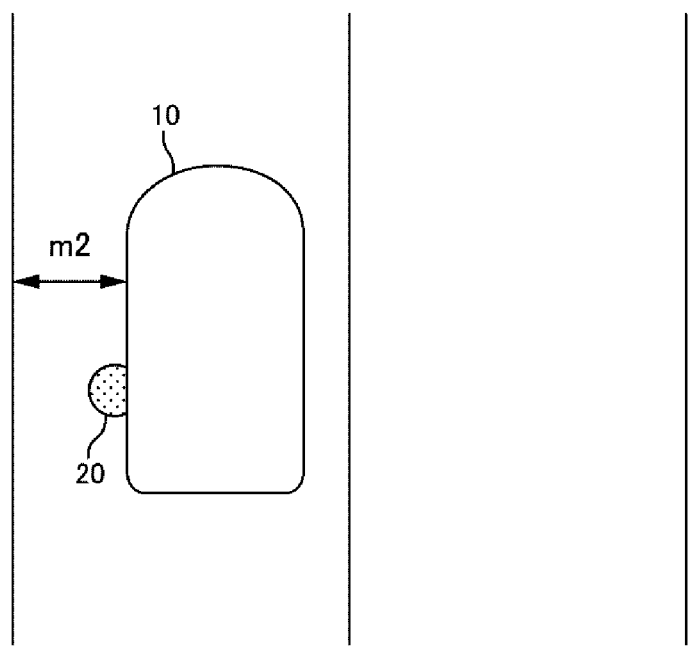

FIG. 9 are diagrams illustrating a state in which the travel position on the road is controlled based on the size of the partial object 20. FIG. 9A illustrates a situation in which no passenger or the like juts outside the target vehicle 10. On the other hand, FIG. 9B illustrates a situation in which a passenger's body is coming out of the left side of the target vehicle 10. In this situation, the control apparatus 200 makes the size of a margin m2 between the left end of the target vehicle 10 and the end of the road in FIG. 9B, be longer than a size of a margin m1 between the left side of the target vehicle 10 and the end of the road in FIG. 9A.

For example, when the size of the partial object 20 is represented by the area of the area representing the partial object 20, the output control unit 206 determines first whether the partial object 20 is present on the left side or the right side of the target vehicle 10. Then, the output control unit 206 decides the size of the margin between the end of the target vehicle 10 at the side where the partial object 20 is present and the end of the road based on the area of the area representing the partial object 20. Here, the correspondence relationship between the area of the area representing the partial object 20 and the size of the margin is defined in advance. For example, a conversion formula for converting the area of the area representing the partial object 20 into the size of the margin is defined in advance. The output control unit 206 decides the size of the margin by applying the area of the area representing the partial object 20 detected by the detection unit 202 to the conversion formula. The travel of the control apparatus 200 is controlled so as to travel while keeping the decided size of the margin from the end of the road.

In addition, for example, when the distance between the partial object 20 and the target vehicle 10 in a predetermined direction is the size of the partial object 20, the output control unit 206 makes the size of the margin between the end of the target vehicle 10 at the side where the partial object 20 is present and the end of the road to be a value obtained by adding the size of the partial object 20 to the usual size of the margin. Alternatively, even in this case, a correspondence relationship between the size of the partial object 20 and the size of the margin is defined in advance, and the margin between the end of the target vehicle 10 and the end of the road may be decided using this correspondence relationship. The usual size of the margin can be defined in advance and stored in an arbitrary storage device accessible from the control apparatus 200.

Here, the output control unit 206 may control the travel position on the road using only the position of the partial object 20 without using the size of the partial object 20. For example, the margin between the end of the target vehicle 10 and the end of the road is defined in advance for each of the three cases: 1) when the partial object 20 does not exist, 2) when the partial object 20 is present on the left side of the target vehicle 10, and 3) when the partial object 20 is present on the right side of the target vehicle 10. Then, the output control unit 206 determines which of the above cases 1) to 3) the target vehicle 10 is in based on the result of detection of the partial object 20 performed by the detection unit 202, and selects the margin corresponding to the result of the determination to control the travel position of the target vehicle 10.

Furthermore, the output control unit 206 may recognize the risk that the partial object 20 (associated object protruding from the target vehicle 10) detected by the detection unit 202 collides with an obstacle, and then, may control the travel position of the target vehicle 10 according to the risk. For example, the output control unit 206 determines the position and shape of the obstacle using the sensor as described above. Further, the output control unit 206 determines whether or not the obstacle is positioned at the position where the partial object 20 travels based on the position and shape of the partial object 20 and the position and shape of the obstacle. Then, if the above-described obstacle is positioned at the position where the partial object 20 travels, the output control unit 206 changes the travel position of the target vehicle 10 to a travel position where the vehicle does not collide with the obstacle. The position and shape of the obstacle on the traveling route of the target vehicle 10 may be determined using the map information.

<<<Control of Travel Route>>>

For example, the output control unit 206 controls the traveling route of the target vehicle 10 based on the size of the partial object 20. The traveling route of the target vehicle 10 can also be expressed as a set of roads on which the vehicle passes toward the destination. As a premise, it is assumed that the traveling route toward the destination is determined in advance.

In this situation, the output control unit 206 determines whether or not there is a road that is not suitable for traveling in a state where the partial object 20 having a computed size is present, in the traveling route after the time when the size of the partial object 20 is computed by the detection unit 202. Here, "the road that is not suitable" means a road where the margin between the end of the road or the ceiling and the target vehicle 10 is not so sufficient to travel, or a road where there is a high probability of accident of collision or the like due to the insufficient size of the margin.

In the traveling route, if it is determined that there is a road not suitable for traveling, the output control unit 206 changes the traveling route such that only the road suitable for traveling in a state where the partial object 20 having a computed size is present. On the other hand, in the traveling route, if it is determined that there is no road that is not suitable for traveling, the output control unit 206 does not change the traveling route.

As described above, if the traveling route is decided based on the size of the partial object 20, it is assumed that the map information used for deciding the traveling route includes information indicating the width of the road and height of the ceiling (height limit). The output control unit 206 determines whether each road is suitable for the traveling of the target vehicle 10 using this information.

According to the method in which the traveling route is controlled based on the size of the partial object 20, differently from the method in which the traveling route is defined in advance based on the static shape of the target vehicle 10 defined in advance, it is possible to make the vehicle reach the destination through a safe road according to the dynamically changing partial object 20. Therefore, it is possible to avoid a situation that the target vehicle 10 falls into a dangerous situation with high accuracy.

<<Notification Information>>

The output control unit 206 outputs notification information based on the detected partial object 20. For example, the notification information is a notification for informing the driver of the target vehicle 10 of a fact that the passenger or baggage is in a dangerous situation. In addition, for example, the notification information is a message to the passenger who is in the dangerous situation (the passenger detected as the partial object 20) including: a message saying that the passenger's state is a dangerous state, a message prompting to stop the dangerous actions, or a message indicating that the travel control of the target vehicle 10 is performed (for example, decrease of the velocity of the target vehicle 10 is performed).

For example, the notification information includes information relating to the detected partial object 20. The information relating to the partial object 20 is information indicating the position where the partial object 20 is detected and the type of the partial object 20 (whether it is a person or a baggage). The type of partial object 20 can be determined using a method such as an object recognition. When the partial object 20 is a person, the type of the partial object 20 may indicate which part of the person the partial object 20 is (such as a hand or a face).

The position where the partial object 20 is detected indicates, for example, any one of the right side of the target vehicle 10, the left side of the target vehicle 10, and the upper side of the target vehicle 10. In addition, the position where the partial object 20 is detected may indicate the position of the target vehicle 10 in the depth direction (which row of the seats, the loading platform, or the like).

There are various methods of outputting the notification information. For example, the output of the notification information is realized by turning on a predetermined indicator provided on a dashboard of the target vehicle 10 or the like.

In addition, for example, the output of the notification information is realized by a predetermined message to be displayed on a display screen of the display device. The display device may be a display device installed in the target vehicle 10 in advance, or a portable display device (for example, a display device of a portable terminal owned to the passenger of the target vehicle 10).

In addition, for example, the output of the notification information is realized by a predetermined voice message output from a speaker. This speaker may be a speaker installed in the target vehicle 10 in advance, or a portable speaker (for example, a speaker of a portable terminal owned to the passenger of the target vehicle 10).

The output destination of the notification information is not limited to a cabin of the target vehicle 10. For example, the notification information may be transmitted to a server apparatus provided out of the target vehicle 10. For example, the server apparatus is provided in a management center that manages the travel of the target vehicle 10 (for example, a management center that manages buses and taxis for autonomous driving). The server apparatus of the management center and the control apparatus 200 are connected to each other via, for example, a WAN.

In the management center that has received the notification information, it is preferable to perform the processing according to the notification information. For example, the server apparatus installed in the management center controls the travel of the target vehicle 10. Specifically, the server apparatus acquires the information relating to the partial object 20 and the information (velocity, position, and the like) relating to the target vehicle 10 as the notification information. The server apparatus generates an instruction relating to the travel control of the target vehicle 10 based on the information and transmits the instruction to the control apparatus 200. For example, this instruction is an instruction for specifying the velocity, the traveling route, or the traveling route of the target vehicle 10. The control apparatus 200 that has received this instruction controls the travel of the target vehicle 10 according to the instruction.

In addition, for example, the server apparatus that has received the notification information transmits a warning to the control apparatus 200. At this time, the server apparatus may determine whether or not to transmit the warning to the control apparatus 200 based on the information relating to the partial object 20 indicated in the notification information. For example, when the size of the partial object 20 is larger than the predetermined size or the partial object 20 is detected for equal to or longer than a predetermined time, the control apparatus 200 transmits the warning to the control apparatus 200. The control apparatus 200 outputs the received warning from a speaker or the like installed on the target vehicle 10.

In addition, the output of notification information may be appropriately used in a manner of being divided into the output to the cabin of the target vehicle 10 and the output to the outside the target vehicle 10. For example, the notification information is normally set to output from an output device provided in the cabin of the target vehicle 10. When a predetermined condition is satisfied, the notification information is output to the outside such as a management center. The predetermined condition is, for example, when the cumulative number of detected partial objects 20 is equal to or greater than a predetermined number, or when the size of the partial object 20 is equal to or larger than a predetermined value.

In addition, for example, the notification information may be output to a storage device provided inside or outside the target vehicle 10. In this way, the situation in which a dangerous action is performed by the passenger of the target vehicle 10 or the baggage of the target vehicle 10 is in a dangerous state is recorded. This record can be used to figure out the reasons of an accident when the target vehicle 10 caused the accident, for example. In this case, it is preferable to record a history of the result of detection performed by the sensor used for detecting the partial object 20 together with the notification information.

<Output Travel Information Based on Predictions>

The output control unit 206 may predict an occurrence of a dangerous situation based on the result of detection of the partial object 20 performed by the detection unit 202, and may output the travel information based on the prediction. For example, the output control unit 206 computes a predicted value of the size of the partial object 20 from the temporal change of the size of the partial object 20 repeatedly detected by the detection unit 202. The control information and the notification information are output based on the predicted value of the size of the partial object 20 using the method similar to the method of outputting the control information or the notification information based on the size of the partial object 20 described above.

For example, when the predicted value of the size of the partial object 20 is equal to or greater than a predetermined value, the control such as decreasing the velocity of the target vehicle 10 is performed. In addition, for example, the control of the travel position of the target vehicle 10 (such as the decision of the margin described above) is performed or the traveling route of the target vehicle 10 is controlled based on the predicted value of partial object 20. In this way, even if it is not possible to determine a dangerous situation only by checking the current state of the passenger and baggage, if the probability that the subsequent state of the passenger or baggage becomes dangerous is high, the travel of the target vehicle 10 is controlled so as to prevent such situation from occurring. As above, since the occurrence of such a dangerous situation can be prevented in advance, it is possible to realize a safe travel of the vehicle.

In addition, for example, when the predicted value of the size of the partial object 20 is equal to or greater than the predetermined value, the notification information is output. In this way, even if it is not possible to determine a dangerous situation only by checking the current state of the passenger and baggage, if the probability that the subsequent state of the passenger or baggage becomes dangerous is high, the passenger is notified in advance of a fact that a dangerous situation may occur. Therefore, the occurrence of a dangerous situation can be prevented in advance by an appropriate action taken by the passenger, and thus, it is possible to realize a safe travel of the vehicle.

The output control unit 206 computes the predicted value of the size of the partial object 20 by predicting a change in the size of the partial object 20 based on the size of the partial object 20 repeatedly detected by the detection unit 202. Specifically, the output control unit 206 estimates the size of the partial object 20 after a predetermined time from the current time by performing prediction processing such as a linear prediction using the sizes of the partial object 20 detected at each different time, and then, handles this estimated value as "a predicted value of the size of the partial object 20".

As an example, it is assumed that the size of the partial object 20 detected at the current time point t is s1, and the size of the partial object 20 detected at the time point t−a is s1−b. In this case, according to the linear prediction, the size of the partial object 20 that increases per unit time is predicted as b/a. Therefore, the predicted value of the size of the partial object 20 after a predetermined time c has elapsed from the current time is s1+bc/a.

The "predetermined time" described above may be a fixed value that is defined in advance, or may be a value that is dynamically decided based on the state of the target vehicle 10. In the latter case, for example, the predetermined time is computed based on the current velocity of the target vehicle 10. This is because how much time it is required to control the velocity, the travel position, and the like of the target vehicle 10 and how early the passenger should be notified of the dangerous situation of the target vehicle 10 are different depending on the velocity of the target vehicle 10.

Therefore, for example, a conversion formula for converting the current velocity of the target vehicle 10 into a predetermined time is defined in advance. The output control unit 206 obtains the predetermined time by applying the current velocity of the target vehicle 10 to this conversion formula.

The method of computing the predicted value of the size of the partial object 20 is not limited to the method using the linear prediction described above. Various existing methods can be used as a method for predicting a future value for a temporally changing value.

<Modification Example>

In the control apparatus 200 described above, the travel information is output according to the partial object 20. However, the control apparatus 200 may output the travel information by predicting that the target vehicle 10 is in a dangerous situation based on information other than the partial object 20. Specifically, the control apparatus 200 outputs the travel information according to an inside state of the target vehicle 10.

For example, the control apparatus 200 controls the travel of the target vehicle 10 according to a state of a window of the target vehicle 10. For example, if a window of the target vehicle 10 is open, the control apparatus 200 controls the travel position of the target vehicle 10 such that the margin between the end of the target vehicle 10 and the end of the road side where the window is open is increased (for example, if the window on the left side in the traveling direction is open, the left side in the traveling direction). The degree of increasing the margin is determined according to the degree of opening of the window, for example. In addition, the control apparatus 200 may control the travel position of the target vehicle 10 only when the degree of opening of the window is equal to or greater than a predetermined degree. An existing technology can be used as a technology for detecting the degree of opening of the window.

In addition, for example, the control apparatus 200 may predict that a person or an object juts outside the target vehicle 10 according to a posture of the passenger of the target vehicle 10 or the belongings, and may output the travel information according to the prediction. For example, in response to a movement passenger's hand or body in the target vehicle 10 in the direction of a window, the control apparatus 200 controls the travel position of the target vehicle 10 such that the margin between the end of the target vehicle 10 and the end of the road side of that window is increased. The degree of increasing the margin is determined according to, for example, the size of the passenger's body approaching the window, the length of the hand, or the size of the object held by the passenger. For example, if the passenger has a stick or a flag, it can be considered that the flag or the stick may jut outside the window. Therefore, it is preferable to increase the margin compared to the case where the passenger does not have such things. The passenger's motion in the vehicle can be recognized using a captured image obtained from a camera provided to image the inside of the vehicle, for example.

Furthermore, the control apparatus 200 may control the travel position of the target vehicle 10 depending on whether or not the passenger is fastening a seat belt. For example, it can be said that a passenger's body who does not fasten the seat belt may be jutting outside the window in a larger amount than that of a passenger who fastens the seat belt. Therefore, for example, the control apparatus 200 corrects the margin by multiplying the size of the margin decided according to the degree of opening of the window by a coefficient according to whether or not the seat belt is fastened. The coefficient when the seat belt is not fastened is larger than the coefficient when the seat belt is fastened. An existing technology can be used as a technology for determining whether or not the seat belt is fastened.

According to the method in which the travel information is output according to the state of the target vehicle 10 in the vehicle, the travel control of the target vehicle 10 can be performed by recognizing a sign before the passenger or the object juts outside the target vehicle 10. Therefore, it is possible to realize the safe travel of the target vehicle 10.

As above, the embodiments of the present invention have been described with reference to the drawings, however, these are exemplifications of the above embodiments or various configurations other than the above can also be adopted.

The present application is based on, and claims priority from Japanese Patent Application NO. 2017-125808, filed on Jun. 28, 2017, the disclosure of which is hereby incorporated in its entirety.

The invention claimed is:

1. A control apparatus comprising:
a detection unit that detects a partial object using a sensor, wherein the partial object is a part of an object riding on a vehicle and is jutting outside the vehicle; and
an output control unit that outputs travel information relating to travel of the vehicle based on the detected partial object,
wherein the detection unit acquires point cloud data as a result of detection performed by the sensor, extracts a foreground area representing the vehicle or the object riding on the vehicle from the point cloud data, and determines an area representing the partial object by computing a difference between the foreground area and a predetermined area representing the vehicle,
wherein the point cloud data is 3D point cloud data,
wherein the detection unit:
generates a cluster by clustering a plurality of point data included in the point cloud data based on a distance between the point data; and
extracts the foreground area by determining, as a cluster representing the foreground area, a cluster that satisfies a condition that a distance to the vehicle is within a predetermined distance or a cluster that satisfies a condition that moves along with the vehicle over time, and
wherein the information relating to the travel of the vehicle includes at least one of notification information indicating information about the partial object and control information for controlling the vehicle.

2. The control apparatus according to claim 1, wherein the information relating to the travel of the vehicle includes notification information indicating information about the partial object, and
wherein the output control unit causes an output device to output the notification information.

3. The control apparatus according to claim 2, wherein the notification information includes information for determining a type of the object riding on the vehicle, or information relating to a position of the object.

4. The control apparatus according to claim 1, wherein the information relating to the travel of the vehicle includes control information for controlling the vehicle, and
wherein the output control unit outputs the control information to an apparatus that controls the travel of the vehicle.

5. The control apparatus according to claim 4, wherein the control information is information for controlling a velocity of the vehicle based on a size of the partial object.

6. The control apparatus according to claim 5, wherein the control information is information for setting the velocity of the vehicle to a value equal to or lower than a second predetermined value when the size of the partial object is equal to or larger than a first predetermined value.

7. The control apparatus according to claim 4, wherein the control information is information for preventing the vehicle from starting moving when a size of the partial object is equal to or larger than a third predetermined value.

8. The control apparatus according to claim 4, wherein the control information is information for deciding a traveling route of the vehicle based on at least one of a size of the partial object and a position of the partial object.

9. The control apparatus according to claim 4, wherein the control information is information for deciding a travel position of the vehicle on a road based on at least one of a size of the partial object and a position of the partial object.

10. The control apparatus according to claim 9, wherein the control information is information for deciding a size of a margin between the vehicle and an object around the vehicle based on at least one of the size of the partial object and the position of the partial object.

11. The control apparatus according to claim 4, wherein the information relating to the travel of the vehicle includes notification information for notifying a passenger of a danger, and
wherein the notification information includes a content of a vehicle control performed by the output control unit.

12. The control apparatus according to claim 1, wherein the sensor is a light detection and ranging (LIDAR) sensor provided on the vehicle.

13. A computer-implemented control method for controlling travel of a vehicle, the control method comprising:
detecting a partial object using a sensor, wherein the partial object is a part of an object riding on a vehicle and is jutting outside the vehicle; and
outputting travel information relating to the travel of the vehicle based on the detected partial object,
wherein the detecting includes acquiring point cloud data as a result of detection performed by the sensor, extracting a foreground area representing the vehicle or the object riding on the vehicle from the point cloud data, and determining an area representing the partial object by computing a difference between the foreground area and a predetermined area representing the vehicle,
wherein the point cloud data is 3D point cloud data,
wherein the detecting includes:
generating a cluster by clustering a plurality of point data included in the point cloud data based on a distance between the point data; and
extracting the foreground area by determining, as a cluster representing the foreground area, a cluster that satisfies a condition that a distance to the vehicle is within a predetermined distance or a cluster that satisfies a condition that moves along with the vehicle over time, and
wherein the information relating to the travel of the vehicle includes at least one of notification information indicating information about the partial object and control information for controlling the vehicle.

14. A non-transitory computer-readable medium storing a program that causes a computer to execute each step of the control method according to claim 13.

15. A control apparatus comprising:
a detection unit that detects a partial object using a sensor, wherein the partial object is a part of an object riding on a vehicle and is jutting outside the vehicle; and
an output control unit that outputs travel information relating to travel of the vehicle based on the detected partial object,
wherein the detection unit acquires point cloud data as a result of detection performed by the sensor, extracts a foreground area representing the vehicle or the object riding on the vehicle from the point cloud data, and determines an area representing the partial object by computing a difference between the foreground area and a predetermined area representing the vehicle, wherein the information relating to the travel of the vehicle includes information for determining a size of a margin between the vehicle and an object around the vehicle based on at least one of a size of the partial object and a position of the partial object, wherein the control apparatus is programmed to correct the margin by multiplying the size of the margin, determined according to a degree of opening of a window of the vehicle, by a coefficient according to whether or not a seat belt in the vehicle is fastened, and wherein the information relating to the travel of the vehicle includes at least one of notification information indicating information about the partial object and control information for controlling the vehicle.

16. A computer-implemented control method for controlling travel of a vehicle, the control method comprising:

detecting a partial object using a sensor, wherein the partial object is a part of an object riding on a vehicle and is jutting outside the vehicle; and outputting travel information relating to the travel of the vehicle based on the detected partial object, wherein the detecting includes acquiring point cloud data as a result of detection performed by the sensor, extracting a foreground area representing the vehicle or the object riding on the vehicle from the point cloud data, and determining an area representing the partial object by computing a difference between the foreground area and a predetermined area representing the vehicle, wherein the information relating to the travel of the vehicle includes information for determining a size of a margin between the vehicle and an object around the vehicle based on at least one of a size of the partial object and a position of the partial object, wherein the margin is corrected by multiplying the size of the margin, determined according to a degree of opening of a window of the vehicle, by a coefficient according to whether or not a seat belt in the vehicle is fastened, and wherein the information relating to the travel of the vehicle includes at least one of notification information indicating information about the partial object and control information for controlling the vehicle.

17. A non-transitory computer-readable medium comprising instructions which, when executed by a computer, cause the computer to carry out:

detecting a partial object using a sensor, wherein the partial object is a part of an object riding on a vehicle and is jutting outside the vehicle; and outputting travel information relating to the travel of the vehicle based on the detected partial object, wherein the detecting includes acquiring point cloud data as a result of detection performed by the sensor, extracting a foreground area representing the vehicle or the object riding on the vehicle from the point cloud data, and determining an area representing the partial object by computing a difference between the foreground area and a predetermined area representing the vehicle, wherein the information relating to the travel of the vehicle includes information for determining a size of a margin between the vehicle and an object around the vehicle based on at least one of a size of the partial object and a position of the partial object, wherein the margin is corrected by multiplying the size of the margin, determined according to a degree of opening of a window of the vehicle, by a coefficient according to whether or not a seat belt in the vehicle is fastened, and wherein the information relating to the travel of the vehicle includes at least one of notification information indicating information about the partial object and control information for controlling the vehicle.

* * * * *